2 Sheets—Sheet 1.
J. F. PETTY & T. J. MOBLEY.
Bee-Hive.
No. 211,043. Patented Dec. 17, 1878.
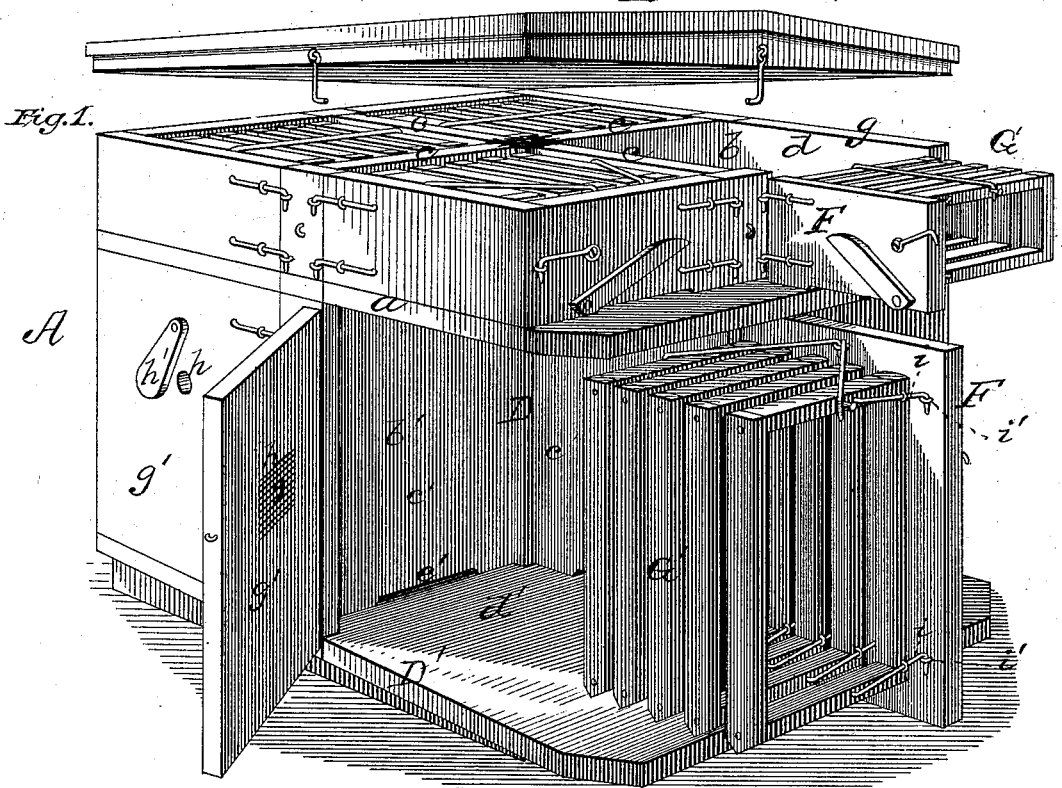
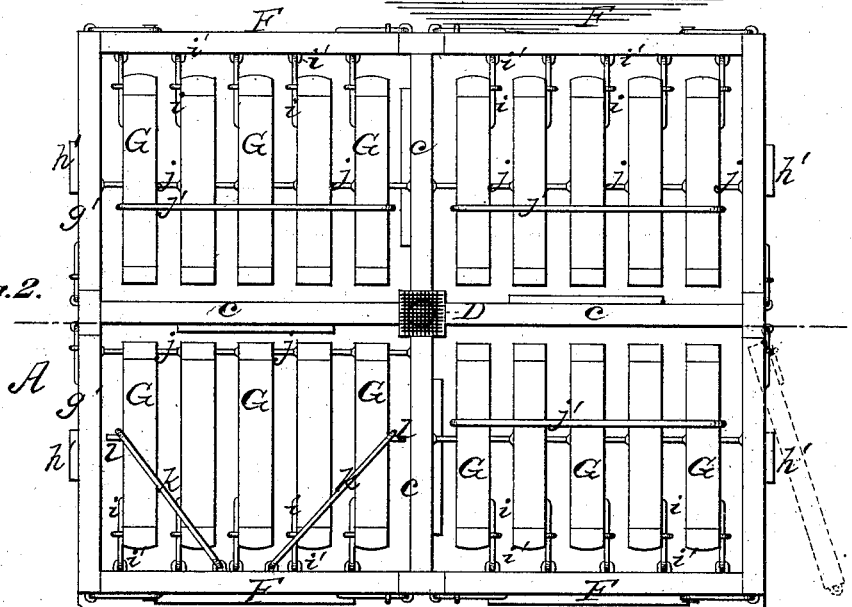
WITNESSES
John A. Lewis.
F. J. Masi
INVENTORS
James F. Petty.
Thos. J. Mobley.
by C. W. Anderson,
their ATTORNEY 2 Sheets—Sheet 2.
J. F. PETTY & T. J. MOBLEY.
Bee-Hive.
No. 211,043. Patented Dec. 17, 1878.
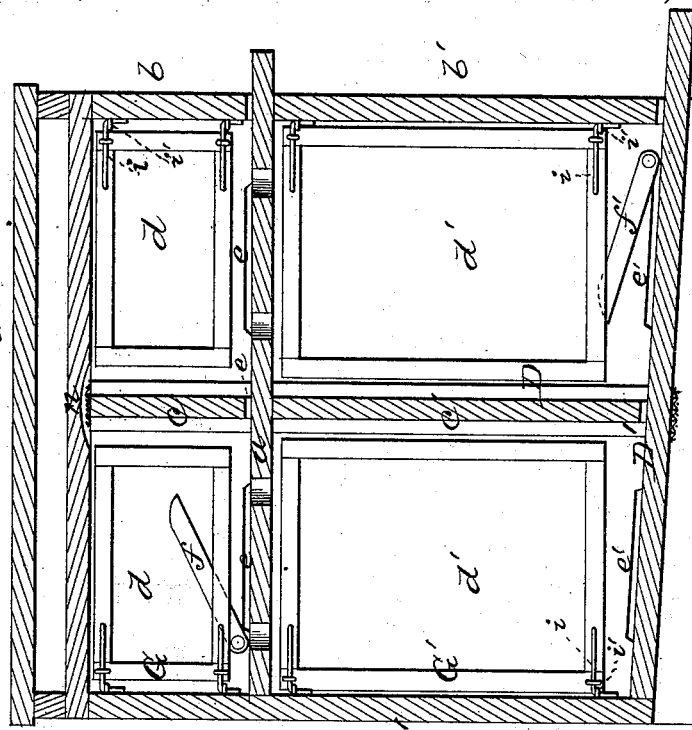
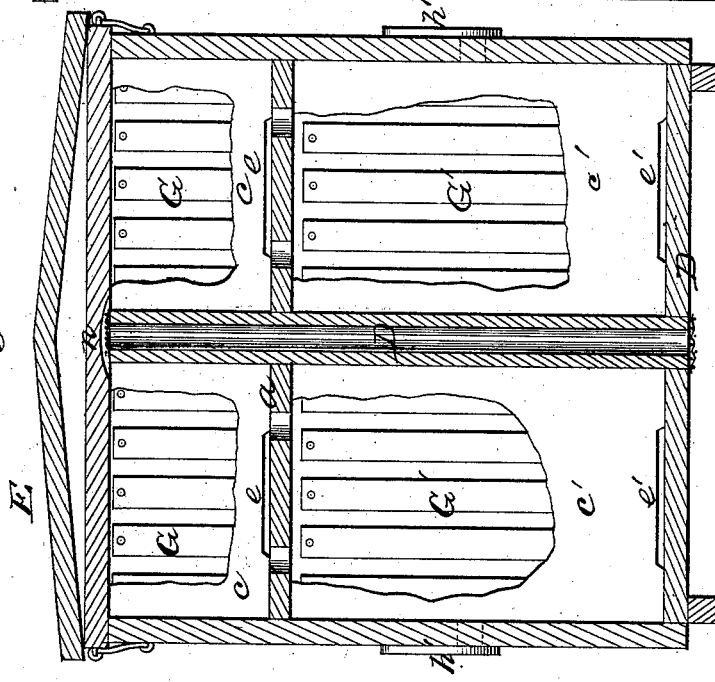
WITNESSES
INVENTORS
James F. Petty
Thos. J. Mobley,
by E. W. Anderson
their ATTORNEY

UNITED STATES PATENT OFFICE.

JAMES F. PETTY AND THOMAS J. MOBLEY, OF FRANKFORD, INDIANA.

IMPROVEMENT IN BEE-HIVES.

Specification forming part of Letters Patent No. 211,043, dated December 17, 1878; application filed November 2, 1878.

*To all whom it may concern:*

Be it known that we, JAMES F. PETTY and THOMAS J. MOBLEY, of Frankford, in the county of Clinton and State of Indiana, have invented a new and valuable Improvement in Bee-Hives; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of our improved bee-hive. Fig. 2 is a horizontal section thereof, and Figs. 3 and 4 are vertical sections of the same.

This invention has relation to improvements in bee-hives wherein a number of separate and distinct hives are assembled in one casing.

The object of the invention is mainly to secure better ventilation of the hives and to regulate the draft according to the temperature of the outside air; to devise means whereby the bees occupying one of the chambers of the hive may be driven out therefrom into those adjacent, a door opened, and the frames swung out of the chamber aforesaid into a position where they can be conveniently examined and removed from the hive; and, finally, to improve the construction of bee-hives generally.

The nature of the invention consists in certain novel arrangements and combinations of parts, as will be hereinafter more fully explained.

In the annexed drawings, the letter A designates the body of our improved hive, the same being a rectangular wooden structure of suitable dimensions. It is divided by a horizontal partition, $a$, into an upper and lower compartment, lettered, respectively, $b\ b'$, and these are again subdivided by transverse partitions $c\ c'$ into four independent honey-chambers, $d$, and brood-chambers $d'$. The honey-chambers communicate with each other through oblong openings $e$, formed in partitions $c$, which openings may be closed at pleasure by means of the slides $f$, and the brood-chambers also communicate through similar openings $e'$, that may also be closed by similar slides $f'$. These honey-chambers also communicate, by apertures in the horizontal partition $a$, each with the brood-chamber next below, in order that the bees may pass freely to every part of the hive.

As shown in Fig. 1, access is had to the honey and brood chambers by means of the hinged doors $g\ g'$, respectively, which doors have a gauze-covered opening, $h$, formed therein, and closed at pleasure by the slide $h'$, for purposes of ventilation.

At the middle of the hive, where the vertical partitions intersect, is a tubular ventilating-shaft, D, extending through the inclined bottom D' of the structure, and terminating above a little short of the roof. This shaft is gauze-covered at each end, and, in connection with the openings in the doors of the honey and brood chambers, effectually ventilates the hive, the draft being regulated by means of the slides $h'$.

The roof E is usually double-pitched, and is secured to the body of the hive by suitable fastenings, as hooks and eyes and the like. The remaining walls of both the honey and brood chambers are hinged to the body of the hive, so that they readily swing out, carrying the frames with them. These latter are provided upon one end with the pintles $i$, that engage corresponding eyes $i'$ on the swinging or hinged side F, and they are maintained at a proper distance apart and properly compact by the pins $j$ and a tie-rod, $j'$, in the nature of a clamp.

The honey-frames are designated in the drawings by the letter G, and the comb-frames in the brood-chambers by the letter G'. These latter are in all essentials provided, like the frames G, with spacing and clamping devices. The latter may be sometimes made of two hooked rods, $k$, pivoted to the hinged sides F near their middle portion, and engaging a headed bolt, $l$, on the two outside frames, as shown.

It being desired to empty one of the honey-chambers, the openings communicating with the remaining chambers being open, smoke is blown into it, and its occupants either stupefied or driven through the said openings into the other chambers. The hinged ends and sides are then opened and the openings aforesaid closed, when the chamber may be rifled of its store, cleaned of moths, or otherwise put in order without molestation from the brood. This being done, the frames are replaced and the doors closed, the communication of the honey-chambers having been previously re-established, and the bees will then re-enter the stripped chamber, and soon commence work.

The ceiling or top of the hive fits closely against the upper end of the central ventilating-shaft, and is provided in its under side with a cruciform groove, $n$, the branches of which lead each to one of the honey-chambers, thus establishing a communication between them and the said shaft.

What we claim as new, and desire to secure by Letters Patent, is—

A bee-hive having four independent honey-chambers and four independent brood-chambers, the former above the latter, a central ventilating-tube open at both ends, and opening at its upper end into a four-branched passage, $n$, in the ceiling of the hive, whereby one ventilating-tube is made to ventilate the whole hive, substantially as specified.

In testimony that we claim the above we have hereunto subscribed our names in the presence of two witnesses.

JAMES F. PETTY.
THOMAS J. MOBLEY.

Witnesses:
J. R. BROWN,
HENRY Y. MORRISON.